United States Patent [19]
Belnap et al.

[11] Patent Number: 5,273,335
[45] Date of Patent: Dec. 28, 1993

[54] TRUCK RAMP/TAILGATE

[75] Inventors: Philip Belnap, 394 W. 3800 North, Provo, Utah 84604; H. Arthur Wing, Provo, Utah

[73] Assignee: Philip R. Belnap, Provo, Utah

[21] Appl. No.: 973,062

[22] Filed: Nov. 6, 1992

[51] Int. Cl.⁵ .............................................. B62D 33/03
[52] U.S. Cl. ................................. 296/61; 414/537; 14/71.1
[58] Field of Search ............... 296/50, 51, 57.1, 58, 296/61, 62; 108/143, 137; 414/537; 14/71.1

[56] References Cited

U.S. PATENT DOCUMENTS

| | | | |
|---|---|---|---|
| 460,196 | 9/1991 | Chase | 414/537 |
| 963,918 | 7/1910 | Miller | 414/537 X |
| 2,603,529 | 7/1952 | Troth et al. | 290/61 |
| 2,611,466 | 9/1952 | Biggert et al. | 414/537 X |
| 3,352,440 | 11/1967 | Wilson | 296/61 X |
| 4,114,944 | 9/1978 | Joynt et al. | 414/537 X |
| 4,864,673 | 9/1989 | Adaway et al. | 414/537 X |

FOREIGN PATENT DOCUMENTS

| | | | |
|---|---|---|---|
| 307313 | 9/1917 | Fed. Rep. of Germany | 414/537 |
| 2646646 | 11/1990 | France | 296/26 |

*Primary Examiner*—Dennis H. Pedder
*Attorney, Agent, or Firm*—Thorpe North & Western

[57] ABSTRACT

A combination ramp and tailgate structure is disclosed for installation and use in pickup trucks in which the structure would replace a conventional tailgate. The ramp/tailgate structure includes first, second, third and fourth generally rectangular frame members, the first and second of which are slidably coupled together to move between a nested or collapsed position and an extended position, and a third and fourth of which are likewise slidably coupled together to move between a nested or collapsed position and an extended position. The slidable movement between frame members is in the planes thereof so that a low profile, compact configuration may be maintained when in the collapsed position, yet allows sufficient thickness of the members to permit the ramp to support heavy loads. When the frame members are in nested positions and when the third frame member is pivoted into a position against and parallel with the second frame member, the frame members may be pivoted as a unit to an upright position to serve as a conventional tailgate. When the frame members are moved respectively to their extended positions and when the third frame member is pivoted so that all frame members are generally parallel in the same plane, with a rearward side or edge of the fourth frame member in contact with the ground, the ramp-/tailgate serves as a ramp extending from the ground to the bed of the pickup truck.

17 Claims, 6 Drawing Sheets

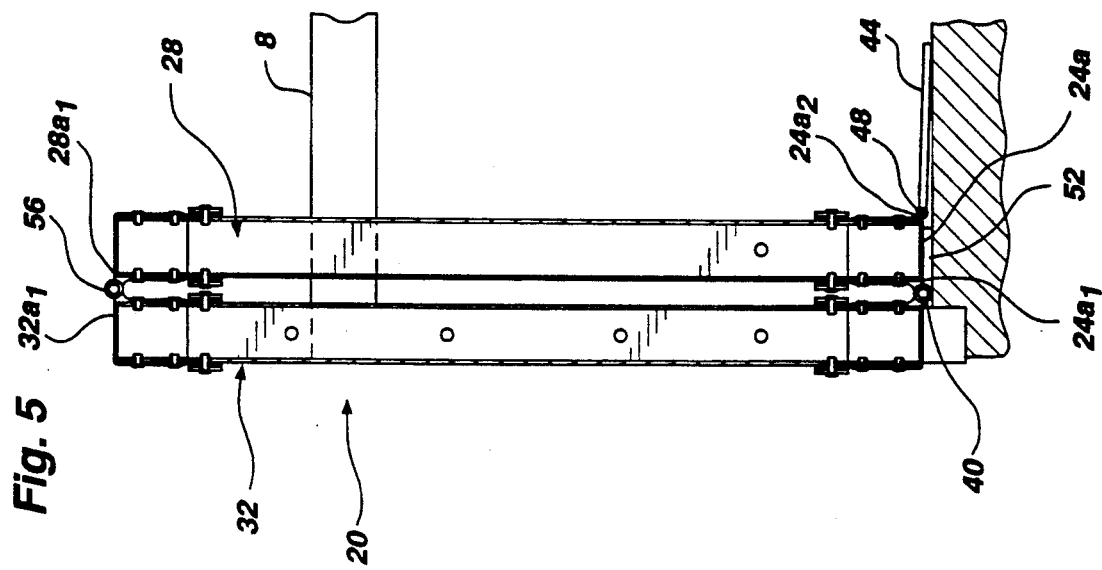
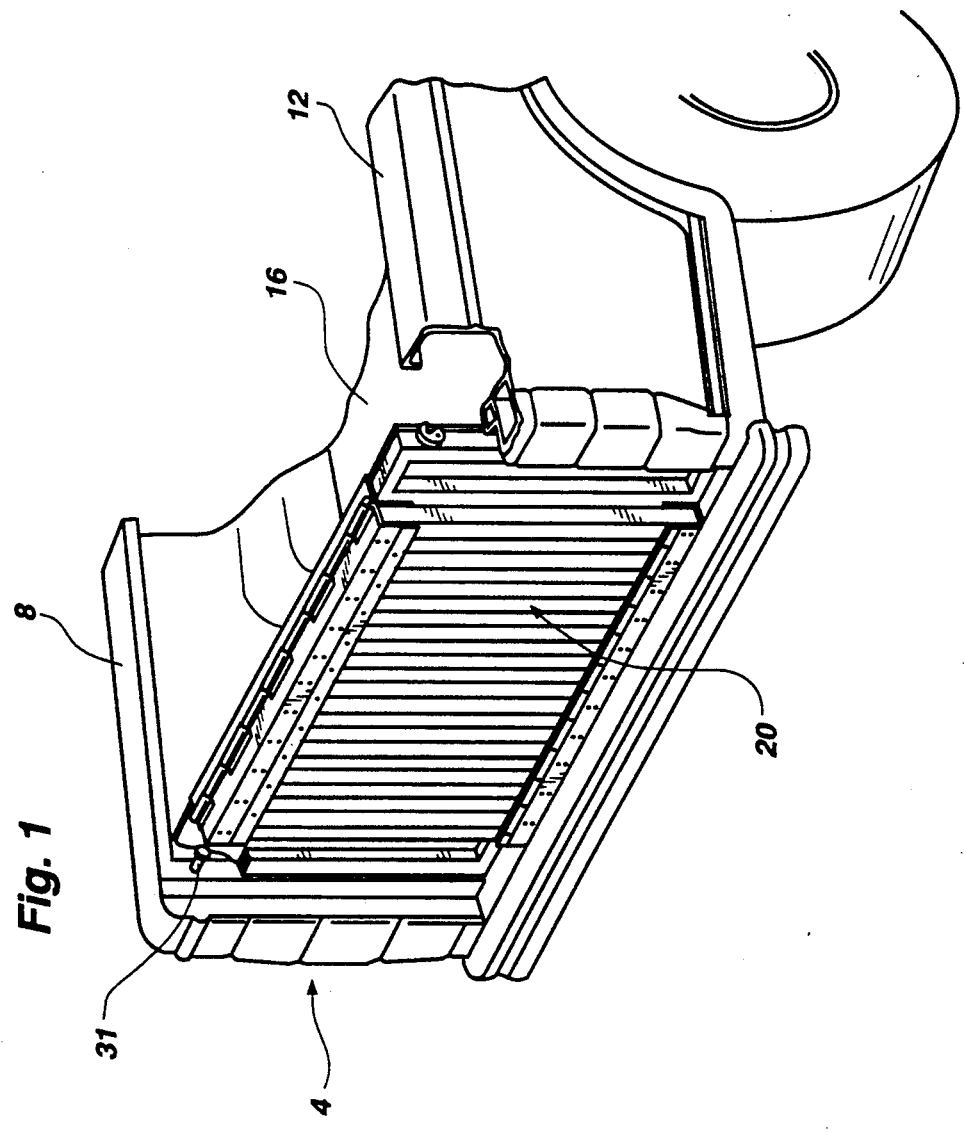

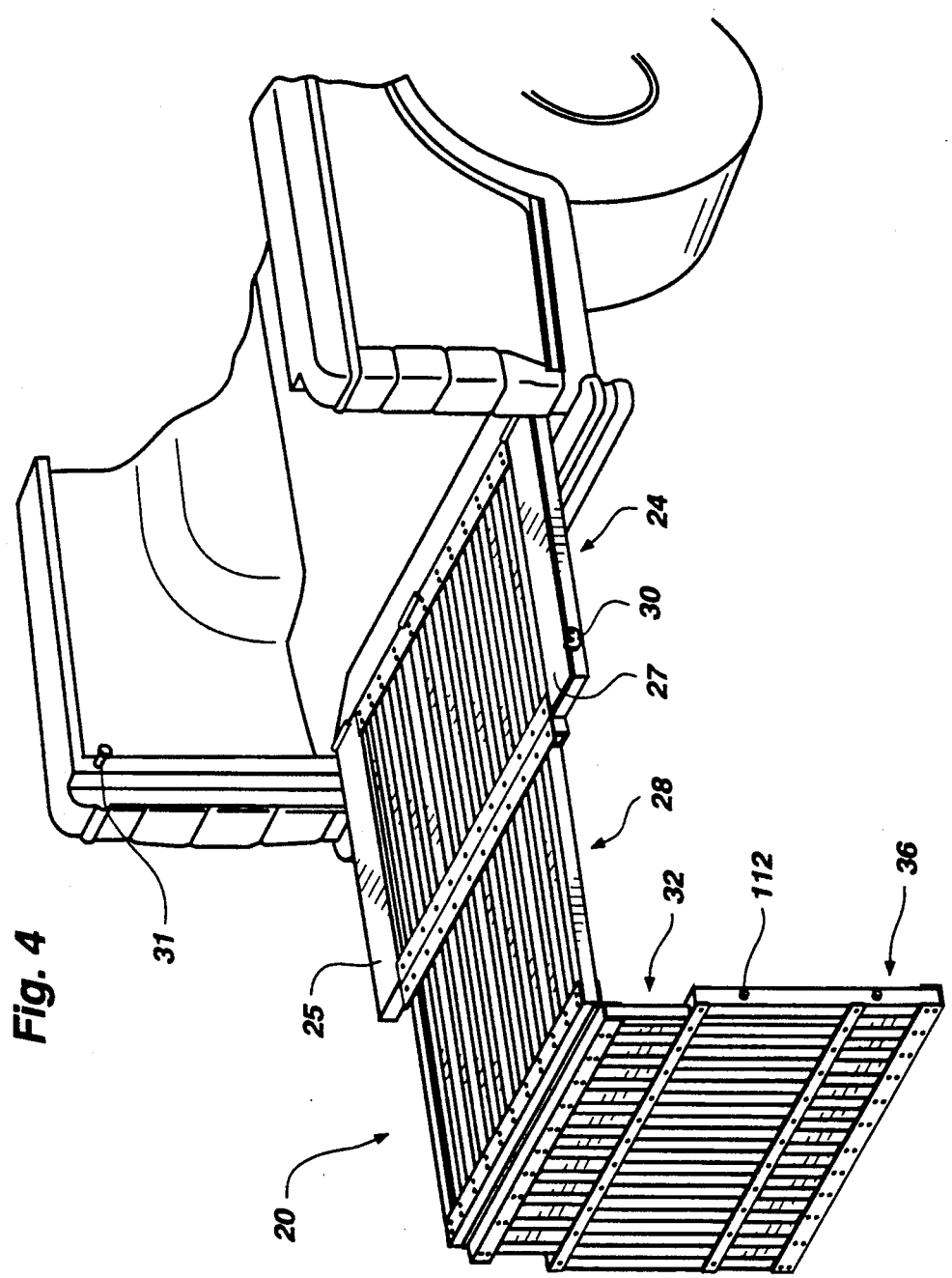

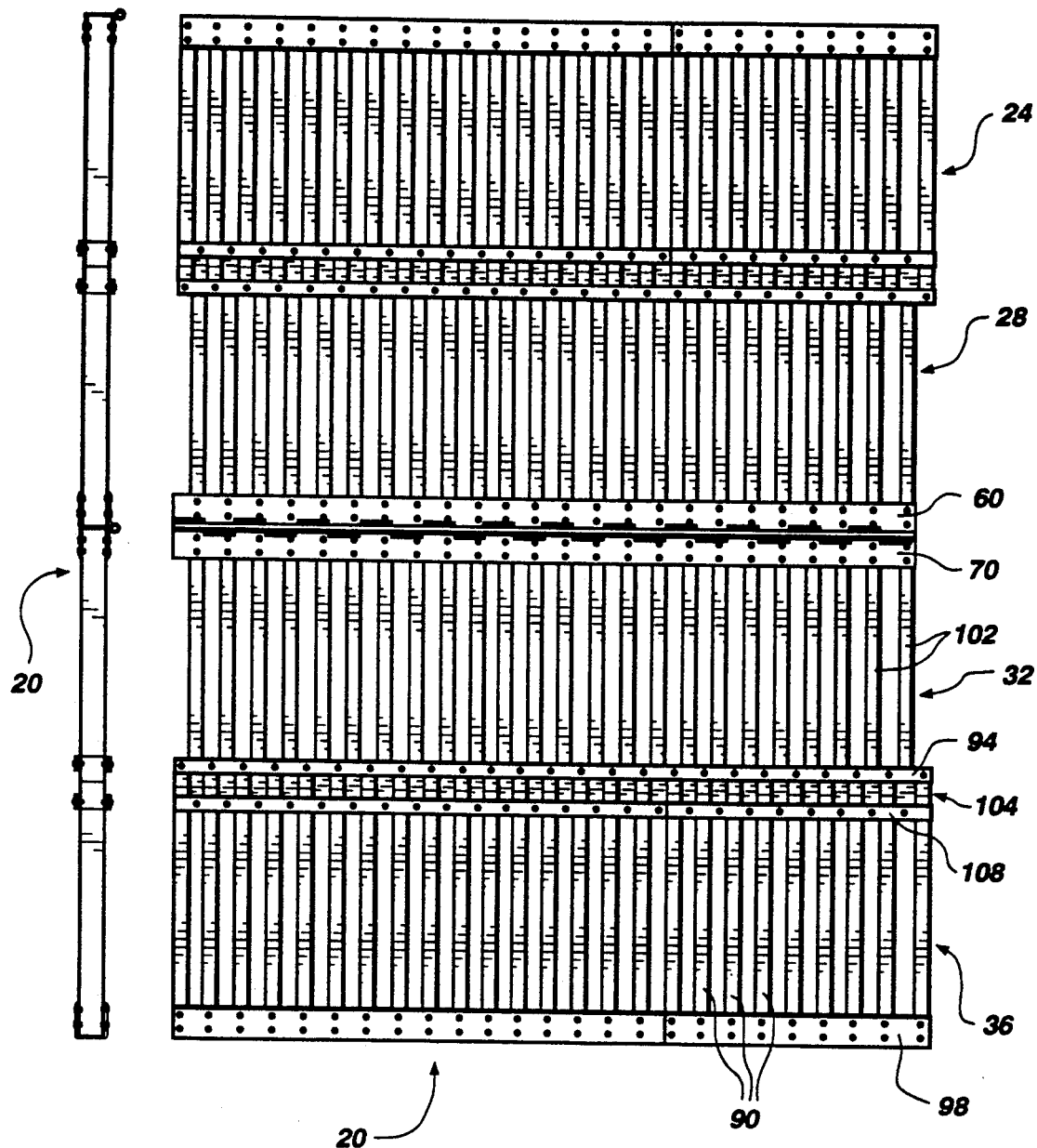

TRUCK RAMP/TAILGATE

BACKGROUND OF THE INVENTION

This invention relates to a combination ramp/tailgate for use with pickup trucks and the like, where the ramp/tailgate may be folded and nested into a compact barrier to serve as a tailgate and also unfolded and extended to serve as a ramp from the ground to the truck bed.

There have been a variety of proposals over the years for built-in ramps for use with pickup trucks ranging from simple bi-fold ramps (U.S. Pat. Nos. 4,735,454, 3,976,209, 3,713,553 and 2,727,781), to somewhat more elaborate multiple panel or section ramps (U.S. Pat. Nos. 4,864,673, 4,668,002, 4,571,144 and 3,642,156) and further to still more elaborate and complicated collapsible or telescopic ramp structures (U.S. Pat. Nos. 4,923,360, 4,628,561 and 4,527,941). These prior art ramp structures all suffer from one or more of the following drawbacks: excessive weight to achieve the desired load strength; bulkiness so that the ramp cannot be folded or collapsed into a compact configuration; insufficient load strength so that only lightweight objects can be used on the ramp, and continued need of a separate tailgate along with the ramp so that the appearance is unsightly and bulky. For those configurations in which the ramp structure is somehow included in existing tailgate designs, the ramp structure is typically constructed to handle only lightweight loads.

SUMMARY OF THE INVENTION

It is an object of the invention to provide a sturdy, compact combination ramp/tailgate for pickup trucks and the like.

It is also an object of the invention to provide a truck ramp/tailgate which serves aesthetically and functionally as a tailgate closure for pickup trucks.

It is a further object of the invention to provide such a truck ramp/tailgate which ma be quickly and easily pivoted and extended from the "tailgate" position to a "loading" or "ramp" position.

It is an additional object of the invention to provide such a truck ramp/tailgate constructed to maintain heavy load bearing capabilities as well as compactness when folded into the "tailgate" position.

It is still another object of the invention to provide such a truck ramp/tailgate structure which may serve not only as a ramp or tailgate, but also as a table.

The above and other objects of the invention are realized in a specific illustrative embodiment of a truck ramp/tailgate for use with a truck bed having a rear end with spaced-apart sidewalls and a bottom wall. The ramp/tailgate includes first and second generally planar rectangular frame members which are slidable relative to one another between a nested, collapsed position and an extended position, said first frame member being pivotally attached along a first side thereof to the truck bed near the open end thereof, to enable pivoting the first frame member between an upstanding position, where it serves as a tailgate for the truck bed, and an open, rearwardly-extending position. The ramp/tailgate also includes third and fourth generally planar rectangular frame members which are slidable relative to one another between a nested, collapsed position and an extended position, the third frame member being pivotally attached along a first side thereof to a first side of the second frame member disposed opposite the first side of the first frame member, to enable folding the third frame member downwardly and forwardly to underlie the second frame member, and downwardly and rearwardly to a position co-planar with the second frame member to serve as a ramp from the truck bed to the ground.

In accordance with one aspect of the invention, the first and second frame members may be positioned generally horizontally and the third and fourth frame members generally vertically to support the first and second frame members so they may serve as a tabletop. The slidable position between the third and fourth frame members may be varied to thereby vary their collective height, which serves as the leg for the tabletop.

BRIEF DESCRIPTION OF THE DRAWINGS

The above and other objects, features and advantages of the invention will become apparent from a consideration of the following detailed description presented in connection with the accompanying drawings in which:

FIG. 1 is a perspective, fragmented view of a pickup truck bed showing a ramp/tailgate installed therein and made in accordance with the principles of the present invention;

FIG. 4 is a perspective, fragmented view of a pickup truck bed showing the ramp/tailgate positioned to serve as a table;

FIG. 5 is a side, cross-sectional view of the ramp/tailgate of the present invention positioned in the "tailgate" position;

FIG. 7 is a side, elevational, cross-sectional view of the ramp/tailgate of the present invention shown in an extended position;

FIG. 8 is a top, plan view of the ramp/tailgate of the present invention shown in an extended position.

DETAILED DESCRIPTION

Figure 2:
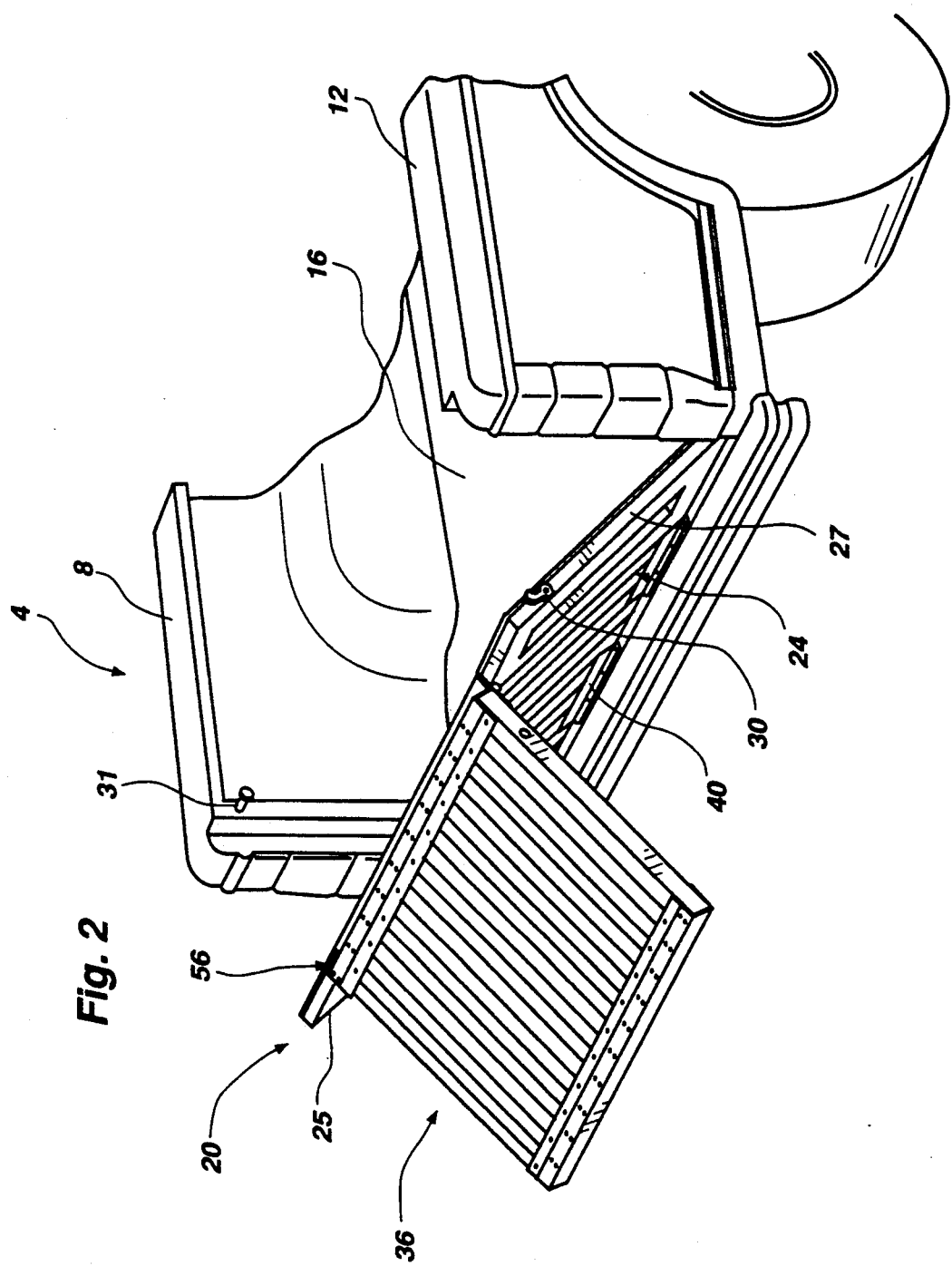
FIG. 2 is a perspective, fragmented view of a pickup truck bed showing the ramp/tailgate partly unfolded.
Figure 3:
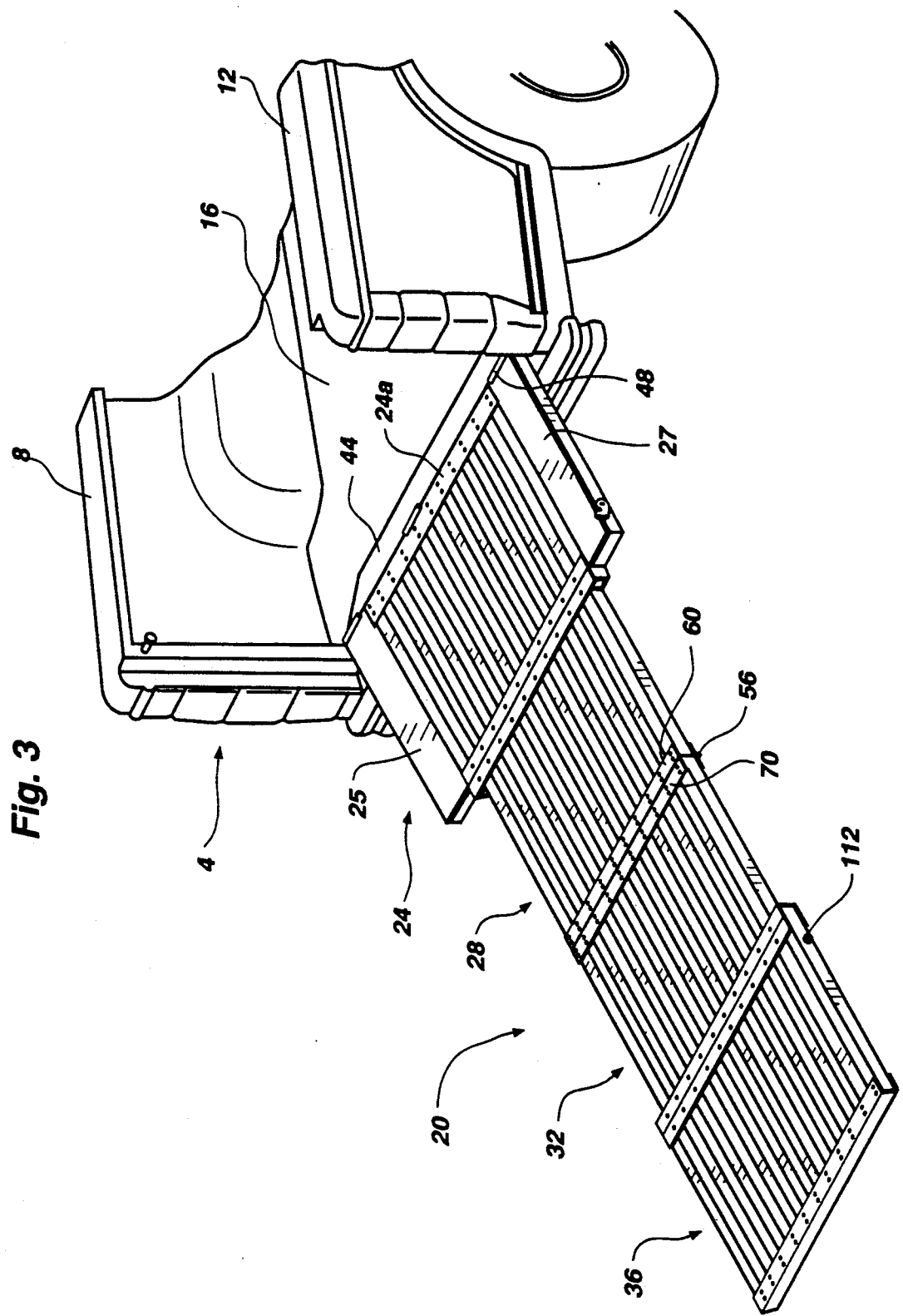
FIG. 3 is a perspective, fragmented view of a pickup truck bed showing the ramp/tailgate in an extended ramp-serving position.

Referring to FIGS. 1, 2 and 3, there is shown a ramp/tailgate mounted in the rear, open end of the bed of a pickup truck 4, shown in fragmented, perspective view. The truck bed includes spaced-apart, vertically positioned sidewalls 8 and 12 and a bottom wall or bed 16. The ramp/tailgate 20 is mounted in the truck bed at the rear end thereof in the position typically occupied by a conventional tailgate.

The ramp/tailgate 20 is composed of four generally planar rectangular frame members 24, 28, 32 and 36, of which frame members 24 and 28 are constructed to slide together in a nested, collapsed relationship and apart in an extended relationship (as shown in FIG. 3), and of which frame members 32 and 36 likewise are constructed to slide together in a nested, collapsed relationship and apart in an extended relationship. The sliding of the frame members takes place in the planes of the frame members so that the side profiles of each pair of slidable frame members has substantially the same thickness whether in the nested position or the extended position. FIG. 2 shows the frame members 24 and 28 in the nested or collapsed position, and frame members 32 and 36 similarly in the nested or collapsed position.

Frame members 28 and 32 are hingedly or pivotally attached together along adjacent sides to allow pivoting of frame member 32 downwardly and forwardly into contact with frame member 28 (or both frame members 28 and 24 if they are nested together), as indicated in FIG. 2 and as fully shown in FIG. 1. Finally, the frame member 24 is hingedly/pivotally attached at its forward side 24a to the top surface of the bottom wall 16 near the rear opening of the truck bed.

In the ramp/tailgate embodiment shown in FIGS. 1-4, frame member 24 includes side panels 25 and 27 which extend laterally to locations adjacent the sidewalls 8 and 12 of the truck bed. Conventional latching mechanisms 30 are disposed on the outside edges of each of the panels 24 and 17 for latching to respective pegs 31 disposed on the sidewalls 8 and 12 of the truck bed.

Figure 6:
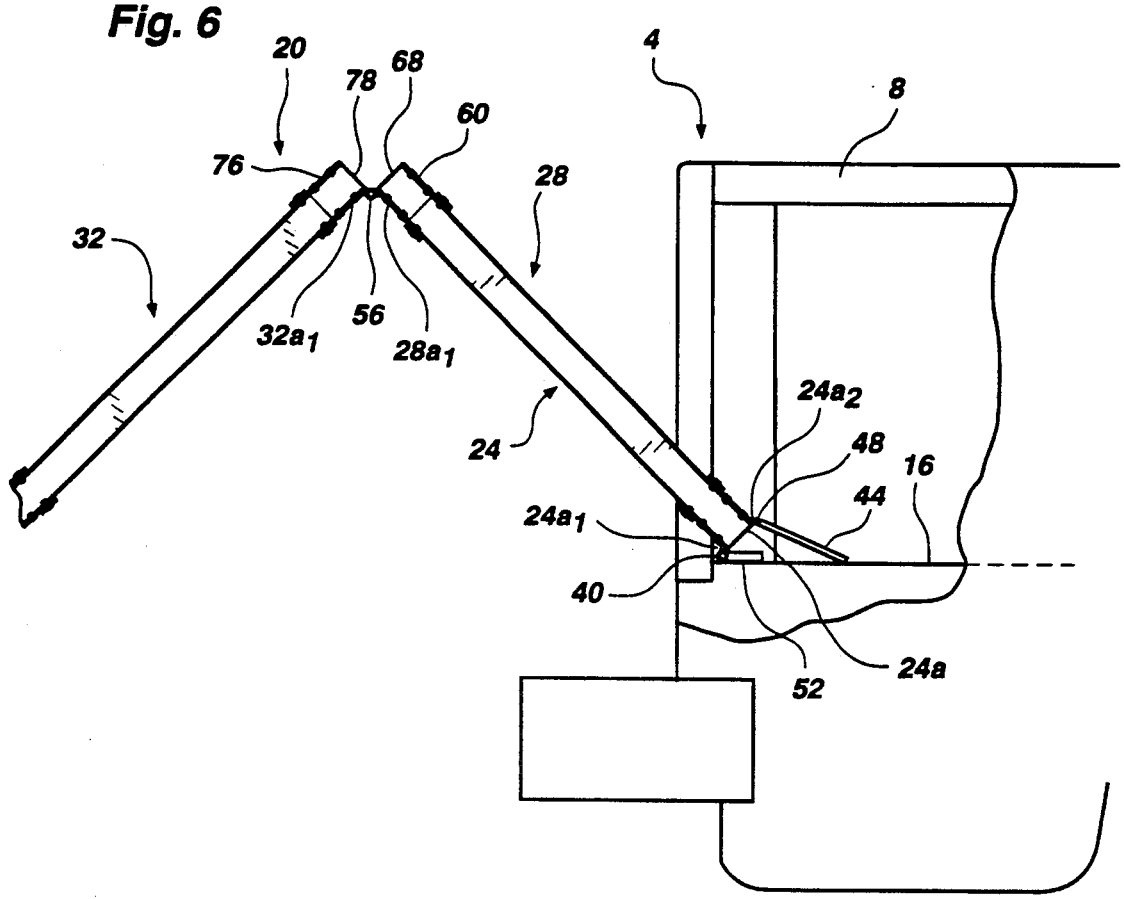
FIG. 6 is a fragmented, side, cross-sectional view of the ramp/tailgate of the present invention shown in a partly unfolded position.

FIGS. 5 and 6 show side, cross-sectional views of the ramp/tailgate 20 in the folded, nested and upright position where it serves as a tailgate (FIG. 5) and a partially unfolded position (FIG. 6). The frame member 24, as indicated earlier, includes a forward side 24a which has a bottom edge 24a1 and a top edge 24a2, with the bottom edge being attached by a hinge 40 to the upper surface of the bottom wall 16 of the truck bed. An elongate plate 44 is pivotally attached by way of a hinge 48 to the top edge 24a2 of the side 24a of the frame member 24. When the ramp/tailgate 20 is in the upright or traditional tailgate position shown in FIG. 5, frame member 24 is also in a generally vertical position with the forward side 24a resting on a support strip 52 disposed on the upper surface 16 of the truck bed to extend across the rear opening thereof. In this position, the elongate plate 44 rests flat on the upper surface 16 of the truck bed, as shown in FIG. 5. When the frame member is pivoted rearwardly, as shown in FIG. 6, the elongate plate 44 is pulled rearwardly with the forward edge thereof sliding over the upper surface 16 of the bottom wall. When the ramp/tailgate is moved to the fully extended position shown in FIG. 3, the plate 44 extends from the top edge 24a2 of the frame member 24, forwardly and downwardly to the upper surface 16 of the bottom wall of the truck bed, to serve as a short ramp from the truck bed onto the ramp/tailgate 20.

Figure 9:
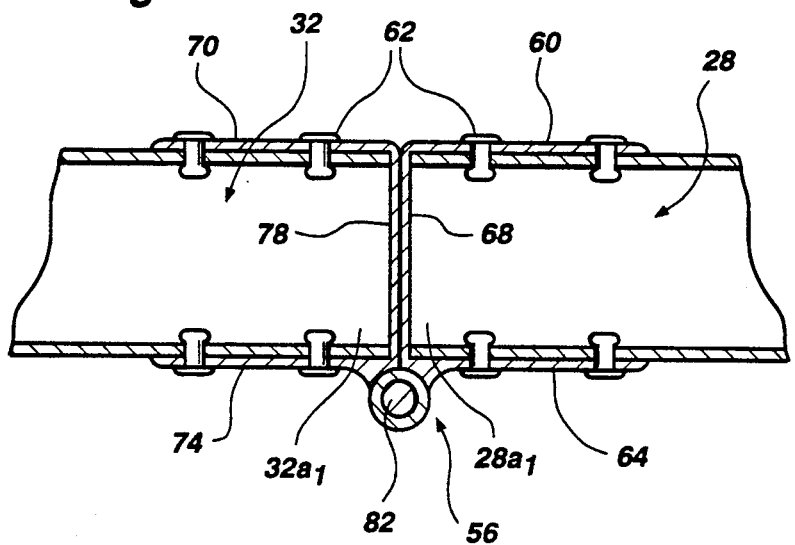
FIG. 9 is a fragmented, side, cross-sectional view of the central hinge of the ramp/tailgate of the present invention.

Frame members 28 and 32 are pivotally joined together along bottom edges 28a1 and 32a1 of respective adjacent sides of the frame members, by a hinge 56. The hinge 56 is shown in cross-sectional area in FIG. 9 to include two halves, one of which has an upper crosspiece or plate 60, a lower crosspiece or plate 64 and an end crosspiece or plate 68 formed to define a U-shaped channel for receiving a rear side of the frame member 28, as shown. The upper plate 60 and lower plate 64 are joined to the frame member 28 by rivets or other fasteners 62. The other half of the hinge 56 similarly includes an upper crosspiece or plate 70, a lower crosspiece or plate 74 and an end crosspiece or plate 78 formed to define a U-shaped channel for receiving a forward side of the frame member 32, as shown. These two halves of the hinge 56 are joined to rotate or pivot about an axis 82 in a conventional fashion.

Referring now to FIGS. 7 and 8, there are shown a side, elevational and cross-sectional view of the ramp/tailgate 20 and a top, plan view of the ramp/tailgate respectively (but without the side panels 25 and 27 shown in FIGS. 1-4. Each frame member of the ramp/tailgate includes a plurality of parallel, spaced-apart spars such as spars 90 of frame member 36. The spars are held in position by crosspieces extending along opposite sides of each frame member and joined to the ends of the spars to hold them in a substantially rigid configuration. Examples of such crosspieces are crosspieces 94 and 98 which are attached to the top sides of the forward ends and rearward ends respectively of the spars 90. Similar crosspieces could also be attached to the bottom sides of the ends of the spars for further rigidity. Similarly, a channel piece having a U-shaped cross-section such as those of the hinge 56 (FIG. 9), could also be used on the rearward ends of spars 90.

The spacing between the spars 90 of frame member 36 are such that spars 102 of frame member 32 may slide longitudinally between the spars 90 as indicated at the location of overlap 104 of FIG. 8. As can there be seen, the rearward ends of the spars 102 of the frame member 32 are joined to a crosspiece 108 which lies along a locus between crosspieces 94 and 98. Similarly, crosspiece 94 lies along a locus between crosspieces 108 and 70 of the frame member 32. With this configuration, the spars 90 and 102 may be slid longitudinally relative to one another to the fully nested position, in which crosspiece 94 would abut against crosspiece 70 and crosspiece 108 would abut against crosspiece 98. Alternatively, the spars of the frame members 32 and 36 could be slid longitudinally to the extended position in which crosspiece 94 would contact and abut against crosspiece 10 to prevent further sliding of the frame member 36 relative to the frame member 32.

The frame members 24 and 28 are similarly constructed to allow sliding of the frame members relative to one another.

The spars of the frame members may be constructed, for example, of aluminum tubes having generally rectangular end cross sections, circular end cross sections, etc. Similarly, the crosspieces of the frame members could also be constructed of aluminum strips. Alternatively, the spars and crosspieces of the frame members could be constructed of other metal alloys.

FIG. 4 is a perspective view showing the ramp/tailgate 20 positioned to serve as a table. The ramp/tailgate is placed in this position by pivoting the frame members rearwardly towards the extended position, sliding frame member 28 rearwardly from frame member 24, pivoting frame members 32 and 36 downwardly to a generally vertical position and then sliding frame member 36 downwardly from frame member 32 until the rearward side of frame member 36 contacts the ground, with frame members 24 and 28 being generally positioned to be horizontal. With the correct height of the "leg" formed by frame members 32 and 36 being established, set screws 112 disposed in the two outside spars of the frame member 36 are fixed to contact and thereby prevent sliding movement with respect to the two outside spars of the frame member 32 (which are located laterally inwardly from the two outside spars of frame member 36). Of course, the height of the "leg" formed by the frame members 32 and 36 can be readily adjusted simply by loosening the set screws 112, sliding frame member 36 in the desired direction relative to frame member 32, and then retightening the set screws.

In the manner described, a simple, compact, sturdy and also aesthetically attractive combination tailgate and ramp is provided. The ramp/tailgate utilizes both a sliding-nesting feature and a pivoting feature to provide the desired compactness and aesthetic presentation, without sacrificing strength and ruggedness. The ramp/tailgate structure of the present invention is simply installed in place of a conventional tailgate and when in the nested and folded position, extending upwardly from the bottom wall of the truck bed, provides a desired rear barrier to hold cargo in place in the truck bed.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A truck ramp/tailgate for use with a truck bed having a rear end with spaced-apart sidewalls and a bottom wall, said ramp/tailgate including first and second generally planar rectangular frame members, having means nestable together in a fixed common plane, and slidable in said common plane relative to one another between a nested, collapsed position and an extended position, said first frame member being pivotally attached along a first side thereof to the truck bed near the open rear end thereof, to enable pivoting the first frame member between an upstanding position, where it serves as a tailgate for the truck bed, and an open, rearwardly-extending position, and third and fourth generally planar rectangular frame members, having means nestable in a second common plane, and slidable in said second common plane relative to one another between a nested, collapsed position and an extended position, said third frame member being pivotally attached along a first side thereof to a first side of the second frame member disposed opposite said first side of the first frame member, to enable folding the third frame member downwardly and forwardly to underlie the second frame member, and downwardly and rearwardly to a position co-planar with the second frame member to serve as a ramp from the truck bed to the ground.

2. A truck ramp/tailgate as in claim 1 wherein said first side of the first frame member has a bottom edge, which is pivotally attached to the truck bed, and a top edge, spaced from and generally parallel with the bottom edge, and disposed above the truck bed when the first frame member is in the open, rearwardly-extending position, said ramp/tailgate further including an elongate generally flat plate hingedly attached at a long side edge to the top edge of said first side of the first frame to extend forwardly and downwardly from the top edge to the truck bed as a ramp, when the first frame member is in the open, rearwardly-extending position.

3. A truck ramp/tailgate as in claim 1 further including means for locking the fourth frame member in selectable slidable positions relative to the third frame member to thereby enable selectively locating the height above ground of the pivotally attached first sides of the second and third frame members when the third and fourth frame members are positioned generally vertically and the first and second frame members are positioned generally horizontally to serve as a table.

4. A truck ramp/tailgate as in claim 1 wherein each of said frame member means comprises a plurality of parallel, spaced-apart spars extending between sides of said each frame member, the spacing between the spars being sufficient to enable sliding and nesting therebetween of the spars of the frame member with which said each frame member is slidable; and at least two crosspieces, each extending along opposite sides of said each frame member and joined to respective sides of the ends of the spars to secure said each frame member in a substantially rigid configuration.

5. A truck ramp/tailgate as in claim 4
wherein one end of the spars of the second frame member is slidably interleaved with and parallel to one end of the spars of the first frame member so that second sides, opposite the first sides, of the first and second frame members overlap, wherein a crosspiece is joined to the second side of the first frame member at a locus between the crosspieces joined to the sides of the second frame member, to abut against the crosspiece joined to the second side of the second frame member when the first and second frame members are slid to the extended position, to thereby prevent the first and second frame member from being slid apart, wherein one end of the spars of the fourth frame member is slidably interleaved with and parallel to one end of the spars of the third frame member so that second sides, opposite the first sides, of the third and fourth frame members overlap, wherein a crosspiece is joined to the second side of the third frame member at a locus between the crosspieces joined to the sides of the fourth frame member, to abut against the crosspiece joined to the second side of the fourth frame member when the third and fourth frame members are slid to the extended position, to thereby prevent the third and fourth frame member from being slid apart.

6. A truck ramp/tailgate as in claim 4 wherein the spars are formed with a generally rectangular cross-section.

7. A truck ramp/tailgate as in claim 4 wherein the crosspieces joined to the first sides of the second and third frame members are joined to the undersides of the frame members and hingedly joined together to allow pivoting the undersides of the second and third frame members toward and away from one another.

8. A truck ramp/tailgate as in claim 7 wherein the crosspiece joined to the first side of the first frame members is joined to the underside of the frame member and hingedly joined to the truck bed to allow pivoting the first frame member between the upstanding position and the open, rearwardly-extending position.

9. A truck ramp/tailgate as in claim 1 wherein the frame members are constructed of aluminum.

10. A truck ramp/tailgate for use with a truck bed having a rear end with spaced-apart sidewalls and a bottom wall, said ramp/tailgate including first and second generally planar frame members, nestable together in a fixed common plane, and slidable in said common plane relative to one another between a nested, collapsed position and an extended position, said first frame member being pivotally attached along a first side thereof to the truck bed near the open rear end thereof, to enable pivoting the first frame member between an upstanding position, where it serves as a tailgate for the truck bed, and an open, rearwardly-extending position.

third and fourth generally planar rectangular frame members nestable in a second common plane, and slidable in said second common plane relative to one another between a nested, collapsed position and an extended position, said third frame member being pivotally attached along a first side thereof to a first side of the second frame member disposed opposite said first side of the first frame member, to enable folding the third frame member downwardly and forwardly to underlie the second frame member, and downwardly and rearwardly to a position co-planar with the second frame member to serve as a ramp from the truck bed to the ground.

wherein each of said frame members comprises a plurality of parallel, spaced-apart spars extending between sides of said each frame member, the spacing between the spars being sufficient to enable sliding and nesting therebetween of the spars of the frame member with which said each frame member is slidable; and at least two crosspieces, each extending along opposite sides of said each frame member and joined to respective sides of the ends of the spars to secure said each frame member in a substantially rigid configuration.

11. A truck ramp/tailgate as in claim 10 wherein said first side of the first frame member has a bottom edge, which is pivotally attached to the truck bed, and a top edge, spaced from and generally parallel with the bottom edge, and disposed above the truck bed when the first frame member is in the open, rearwardly-extending position, said ramp/tailgate further including an elongate generally flat plate hingedly attached at a long side edge to the top edge of said first side of the first frame to extend forwardly and downwardly from the top edge to the truck bed as a ramp, when the first frame member is in the open, rearwardly-extending position.

12. A truck ramp/tailgate as in claim 10 further including means for locking the fourth frame member in selectable slidable positions relative to the third frame member to thereby enable selectively locating the height above ground of the pivotally attached first sides of the second and third frame members when the third and fourth frame members are positioned generally vertically and the first and second frame members are positioned generally horizontally to serve as a table.

13. A truck ramp/tailgate as in claim 10 wherein one end of the spars of the second frame member is slidably interleaved with and parallel to one end of the spars of the first frame member so that second sides, opposite the first sides, of the first and second frame members overlap, wherein a crosspiece is joined to the second side of the first frame member at a locus between the crosspieces joined to the sides of the second frame member, to abut against the crosspiece joined to the second side of the second frame member when the first and second frame members are slid to the extended position, to thereby prevent the first and second frame member from being slid apart, wherein one end of the spars of the fourth frame member is slidably interleaved with and parallel to one end of the spars of the third frame member so that second sides, opposite the first sides, of the third and fourth frame members overlap, wherein a crosspiece is joined to the second side of the third frame member at a locus between the crosspieces joined to the sides of the fourth frame member, to abut against the crosspiece joined to the second side of the fourth frame member when the third and fourth frame members are slid to the extended position, to thereby prevent the third and fourth frame member from being slid apart.

14. A truck ramp/tailgate as in claim 10 wherein the spars are formed with a generally rectangular cross-section.

15. A truck ramp/tailgate as in claim 10 wherein the crosspieces joined to the first sides of the second and third frame members are joined to the undersides of the frame members and hingedly joined together to allow pivoting the undersides of the second and third frame members toward and away from one another.

16. A truck ramp/tailgate as in claim 15 wherein the crosspiece joined to the first side of the first frame members is joined to the underside of the frame member and hingedly joined to the truck bed to allow pivoting the first frame member between the upstanding position and the open, rearwardly-extending position.

17. A truck ramp/tailgate as in claim 10 wherein the frame members are constructed of aluminum.

* * * * *